(12) United States Patent
Cheng et al.

(10) Patent No.: US 8,170,354 B2
(45) Date of Patent: May 1, 2012

(54) SYSTEMS AND METHODS OF INTER-FRAME COMPRESSION

(75) Inventors: Qiang Cheng, Carbondale, IL (US); Michael Pisot, Erlangen (DE); Min Xie, Plainsboro, NJ (US)

(73) Assignees: Siemens Medical Solutions USA, Inc., Malvern, PA (US); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/088,611

(22) Filed: Apr. 18, 2011

(65) Prior Publication Data

US 2011/0194782 A1 Aug. 11, 2011

Related U.S. Application Data

(62) Division of application No. 11/788,005, filed on Apr. 18, 2007, now Pat. No. 7,957,601.

(60) Provisional application No. 60/841,261, filed on Aug. 30, 2006.

(51) Int. Cl.
*G06K 9/36* (2006.01)

(52) U.S. Cl. ...................................................... 382/232

(58) Field of Classification Search .......... 382/232–250; 375/240.01–240.29
See application file for complete search history.

(56) References Cited

U.S. PATENT DOCUMENTS

| 5,594,842 | A | 1/1997 | Kaufman et al. |
| 5,760,781 | A | 6/1998 | Kaufman et al. |
| 6,339,618 | B1 * | 1/2002 | Puri et al. ................. 375/240.16 |
| 6,674,430 | B1 | 1/2004 | Kaufman et al. |
| 6,680,735 | B1 | 1/2004 | Seiler et al. |
| 6,798,412 | B2 | 9/2004 | Cowperthwaite |
| 7,098,907 | B2 | 8/2006 | Houston et al. |
| 7,133,041 | B2 | 11/2006 | Kaufman et al. |
| 7,289,674 | B2 | 10/2007 | Karczewicz |
| 7,529,418 | B2 * | 5/2009 | Goss ............................ 382/236 |
| 7,848,584 | B2 | 12/2010 | Monro |
| 2005/0238098 | A1 | 10/2005 | Fandrianto et al. |
| 2006/0013316 | A1 | 1/2006 | Fandrianto et al. |

OTHER PUBLICATIONS

JPEG-LS; http://www.jpeg.org/jpeg/jpegls.html; 2004.
JPEG 2000; Our New Standard; http://www.jpeg.org/jpeg2000; 2004.
Windows Media Photo; photographic still image file format; feature specification; 2005 Microsoft Corporation.
International Telecommunication Union; CCITT the international telegraph and telephone consultative committee; terminal equipment and protocols for telematic services; information technology—digital compression and coding of continuous-tone still images—requirements and guidelines; T.81 (Sep. 1992).

* cited by examiner

*Primary Examiner* — Ishrat I Sherali
(74) *Attorney, Agent, or Firm* — Peter Kendall

(57) ABSTRACT

A system and method for rendering images, and performing operations such as windowing and leveling, when the parameters of a client appliance are known and rendering images when the parameters of a client appliance are unknown. The invention also considers the rendering from the client appliance perspective and the server appliance perspective.

9 Claims, 11 Drawing Sheets

SYSTEMS AND METHODS OF INTER-FRAME COMPRESSION

CROSS-REFERENCE TO RELATED APPLICATIONS

This application is a divisional application of U.S. patent application Ser. No. 11/788,005 filed on Apr. 18, 2007. This application claims a priority benefit to provisional application Ser. No. 60/841,261, filed on Aug. 30, 2006 and entitled "Inter-Frame Compression Methods And Systems For Windowing And Leveling Operations In Client-Server Environment," which is hereby incorporated by reference in its entirety herein.

BACKGROUND

1. Field of the Invention

This invention relates generally to imaging systems. More specifically, the present invention is directed to systems and methods of image processing in which rendered images are encoded at a server location and transmitted to a client location to enable real time interactions.

2. Background Discussion

Medical imaging techniques provide doctors and medical technicians with valuable data for patient diagnosis and care. Various imaging techniques include cardiac angiography, peripheral angiography, radiography, computed tomography and positron emission tomography. All of these imaging techniques produce medical images that are studied by medical personnel. A higher quality image leads to more accurate diagnosis.

Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs.

Cardiac angiography, also known as coronary angiography, is a type of angiographic procedure in which the contrast medium is injected into one of the arteries of the heart, in order to view blood flow through the heart, and to detect obstruction in the coronary arteries, which can lead to a heart attack.

Peripheral angiography, in contrast, is an examination of the peripheral arteries in the body; that is, arteries other than the coronary arteries. The peripheral arteries typically supply blood to the brain, the kidneys, and the legs. Peripheral angiograms are most often performed in order to examine the arteries which supply blood to the head and neck, or the abdomen and legs.

Computed Tomography (CT), originally known as computed axial tomography (CAT or CT scan), is an imaging technique that uses digital geometry processing to generate a three dimensional image of internal features of an object from a series of two-dimensional x-ray images taken around a single axis of rotation. An iodine dye, or other contrast material, may be used to make structures and organs easier to see on the CT picture. The dye may be used to check blood flow, find tumors, and examine other problems.

Positron emission tomography (PET) imaging may also be used. In PET imaging, a short-lived radioactive tracer isotope, which decays by emitting a positron, and which has been chemically incorporated into a metabolically active molecule, is injected into the patient. The radioactive decay of the positrons is measured to generate an image.

In many medical imaging techniques, such as those described above, three-dimensional (3D) volumetric data is used to render a two-dimensional (2D) representation, or image of the 3D data. For example, in a client-server visualization environment, a user may use a client machine, coupled to the server, to interactively visualize 3D data. Multiple users may each use a different client machine, or terminal having particular operational functionality and capabilities. Indeed, volume rendering of 3D data usually requires intensive computations, while the client machines, operatively coupled to the server, may be of different types, such as simple terminal, thin client, or rich client.

The resource limitations, or capabilities of the client machine, are usually an issue since the server typically renders the images and transmits the rendered images to the client. In order for the server and the client machine to have real-time interactions, the server must have sufficient speed for both rendering the 3D dataset and transmitting rendered 2D images to the client machine.

However, for many applications, conventional image processing techniques are not sufficient since the client terminals lack adequate speed and processing capabilities to effectively interact with the server in real-time.

Therefore, it would be an advancement in the state of the art to provide a system and method of generating high quality image data while using thin client terminals in a network.

SUMMARY

Accordingly, an embodiment of the present invention is directed to systems and methods of image processing that facilitates fast transmission of rendered images from a server to a client terminal.

One embodiment of the present invention is directed to a method for rendering an image at a client appliance when operating parameters such as windowing and leveling are unknown.

Another embodiment of the present invention is directed to a method for rendering an image at a client appliance when operating parameters such as windowing and leveling are known.

Yet another embodiment of the present invention is directed to a method for rendering an image at a server appliance when operating parameters such as windowing and leveling are unknown.

Yet another embodiment of the present invention is directed to a method for rendering an image at a server appliance when operating parameters such as windowing and leveling are known.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
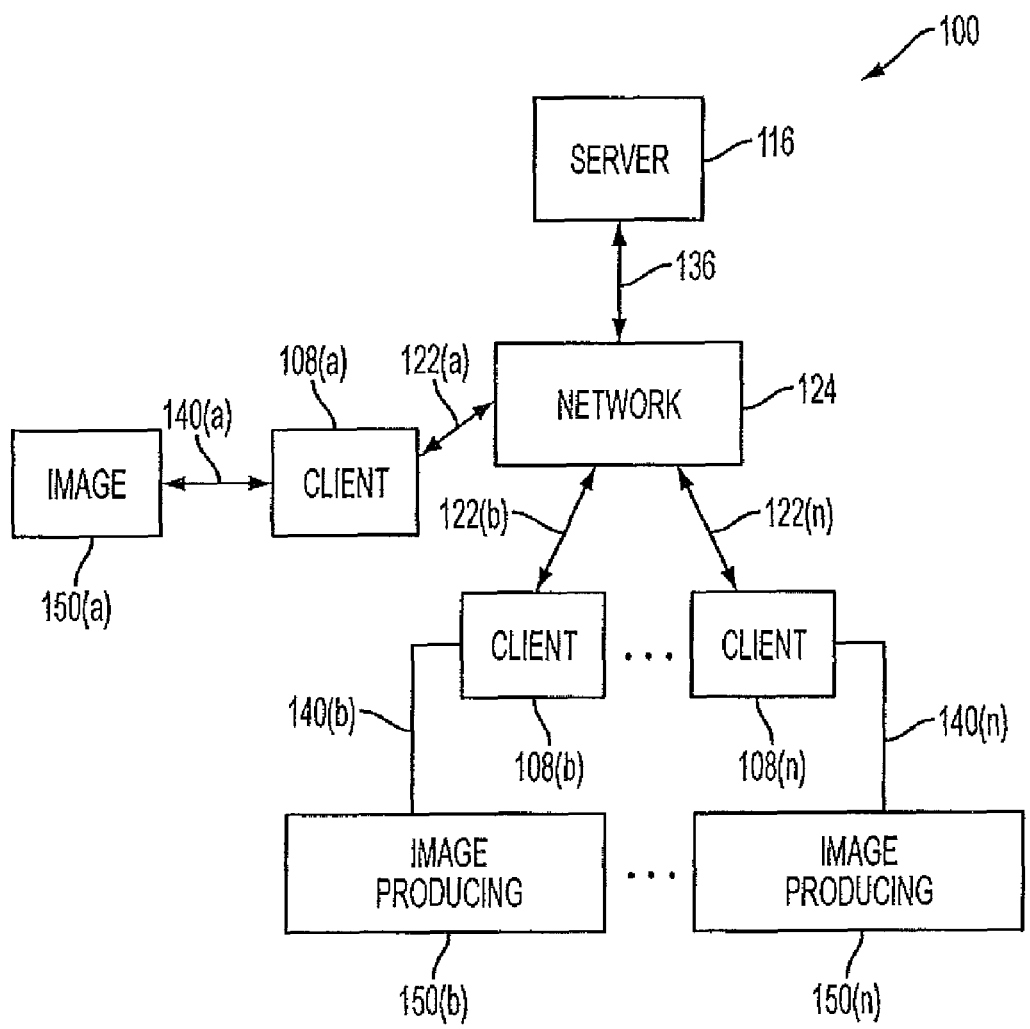
FIG. 1 illustrates a network environment of an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. The term module means software code, machine language or assembly language, an electronic medium that may store an algorithm or algorithm or a processing unit that is adapted to execute program code.

One way to increase transmission speed of image data is to compress the rendered images to smaller sizes using encoding techniques. One embodiment of the present invention is a technique to encode the rendered images efficiently at the server side, so that the images can be transmitted to a remote client to enable real time interactions.

Many techniques or codecs can be applied to compress the rendered images one by one, by treating them as individual images. These techniques or codecs include, for example, JPEG-LS, JPEG2000 or WMP (Windows Media Photo) for lossless, or JPEG, JPEG2000 or WMP for lossy.

For visual content compression, as mentioned above, many techniques for compression, or the so-called codecs, have been developed, including JPEG (JPEG), JPEG-LS (JU), JPEG2000 (J2K), WMP (WMP), etc. Some of these techniques are for lossless compression of images, while others are for lossy compression of images. These techniques may be applied directly to encode the rendered images for client-server environment, by treating each rendered image independently. However, the inter-frame redundancy between rendered images is not utilized efficiently by so doing. To reduce the inter-frame redundancy, video codecs may be adopted such as MPEGs or H.26×. However, these video codecs usually need hardware support so that an acceptable frame rate, such as 30 Hz, can be reached. This may not be applicable due to heterogeneous client machines, which may be a terminal apparatus only, such as thin clients that cannot afford complex decoders. A simple solution is to use the interframe difference to reduce the redundant information, and compress and transmit the residual image only. This may be efficient when the consecutive images are extremely similar in content, otherwise, it may prove less useful.

At the client side, a user interface is usually provided. It is a means for the user to interact effectively with the dataset and the server. Usually, the interface between the user and the machine is fixed after a visualization system is chosen. For example, in Siemens' client-server systems, Syngo™ may be used for rendering and the multi-segment window may be used as the interface. The interface usually allows for a number of predefined manipulations, including windowing and leveling, zooming, panning, rotating, etc. The user may choose one from a list of manipulations, and set the operations settings to use during the image manipulation. After the user chooses a specific rendering operation, he or she can further adjust the rendering parameters for that specific operation through a mouse, track ball, cursor, keyboard or user input. The specified operations with particular parameters are sent from the client appliance to the server appliance for rendering.

In order to facilitate the fast transmission of the rendered images, it is an embodiment of the present invention that there are specifically designed compression methods and systems for several given rendering operations. This is accomplished by developing a compression system for the rendering system. The specific rendering operations include, for example, windowing and leveling, panning, zooming, and other image manipulation operations.

An embodiment of the present invention is directed to rendering images using an operation such as panning, zooming, windowing or leveling with either known or unknown parameters. The client terminal, which outputs the rendered image may be a thin terminal.

FIG. 1 illustrates a network environment 100 of the present invention. The environment 100 includes a plurality of client appliances, or terminals or devices 108(a) . . . (n) (where n is any suitable number). The client appliances (generally 108) may be either fat or thin terminals and include a display module (not shown), such as a monitor, liquid crystal display (LCD) display device or other display module. Each client appliance may also include an input module (not shown) such as a keyboard, mouse, track ball or other input mechanism.

The client appliance 108 may also be coupled to an image producing apparatus (generally 150). The image producing apparatus may be an x-ray machine, CT device, PET device, MRI device or other medical imaging apparatus suitable to produce image data related to a patient.

The image producing apparatus 150 is coupled to client appliance 108 via communication media 140, which is used to provide image data to client terminal 108. Communication media 140 (generally) are, for example, a USB bus, IEEE bus or other bi-directional communication medium that is capable of transmitting data, typically representing a one or more images in an electronic format.

The client appliance is also coupled to network 124 via a bi-directional communication medium 122, which is typically a USB bus, IEEE bus or other bi-directional communication medium that is capable of transmitting data, typically in electronic form of bits representing a one or more images and other control data in electronic format.

Client appliance, or module, or unit 108 is typically a computer, with storage and processing functionality to perform image processing, and transmits the image data for display on the image display unit. The client appliance 108 typically includes a CPU and memory modules to perform the necessary data processing and storage functions.

More specifically, client terminal 108 is typically one or more computers, or other processing device(s), wireless processing device, personal computer (PC), desktop, notebook, information appliance and the like.

The image display unit, or module, (shown as element 118 in FIG. 2A) is coupled to processor unit 108 via bidirectional communication medium (shown as element 136 in FIG. 2A), which is typically a bus or wired connection or wireless connection. The display unit is used to display the image data generated by the system 100. The display unit 118 may be, for example, a monitor, LCD, a plasma screen, a graphical user interface (GUI) or other module adapted to display output data typically by a representation of pixels.

The input module or unit (shown as element 114 in FIG. 2A) is coupled to processing unit 108 via bidirectional communication medium (shown as element 134 in FIG. 2A), which is typically a bus or wired connection or wireless connection. The input module may include devices such as a keyboard, mouse, track ball and/or touch pad or any combination thereof.

The image display module may also be coupled to another CPU, processor, or computer, such as a desktop computer, or a laptop computer (not shown), and may also be coupled to a keyboard, a mouse, a track ball, or other input device (not shown) and may also have control mechanisms, such as mechanisms to adjust the view, dimensions, color, font, or display characteristics. The client appliance 108 may also be coupled to a printer (not shown) to print the output, or a transmission module, such as a DSL line (not shown) or a modem, such as a wireless modem (not shown), to transmit the output to a second location or another display module. This transmission may also be accomplished using a network, such as the Internet, with web browsing capability, or other network of operatively coupled computers, processors, or output devices. One example of a network is shown in FIG. 1 as element 124.

The network 124 is, for example, any combination of linked computers, or processing devices, adapted to transfer (transmit and/or receive) and process data. The network 120 may include wireless and wired transmission capabilities. The network 124 may be a private Internet Protocol (IP) network, as well as a public IP network, such as the Internet that can utilize World Wide Web (www) browsing functionality. Alternatively the network 124 may be an Ethernet network, or any two or more operatively coupled processing devices that can share information.

An example of a wired network is a network that uses communication busses and MODEMS, or DSL lines, or a local area network (LAN) or a wide area network (WAN) to transmit and receive data between terminals (such as client appliance 108(*a*) . . . (n) and server appliance 116). An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems that enable connection to the Internet or other machines that have Wi-Fi functionality. Wi-Fi networks broadcast radio waves that can be picked up by Wi-Fi receivers that are attached to different computers.

Server appliance, terminal or device 116 is an electronic storage medium, such as a processing module, computer, or other electronic storage repository that can store, process and transmit data used by system 100. The server appliance, or module 116 may include, for example, RAM, ROM, EEPROM or other memory media, such as an optical disk, optical tape, CD, or a floppy disk, a hard disk, or a removable cartridge, on which digital information is stored in the form of bits. The server appliance, or module, 116 is shown as remote memory coupled to network 124 via wired or wireless bi-directional communication medium 136.

Figure 2A:
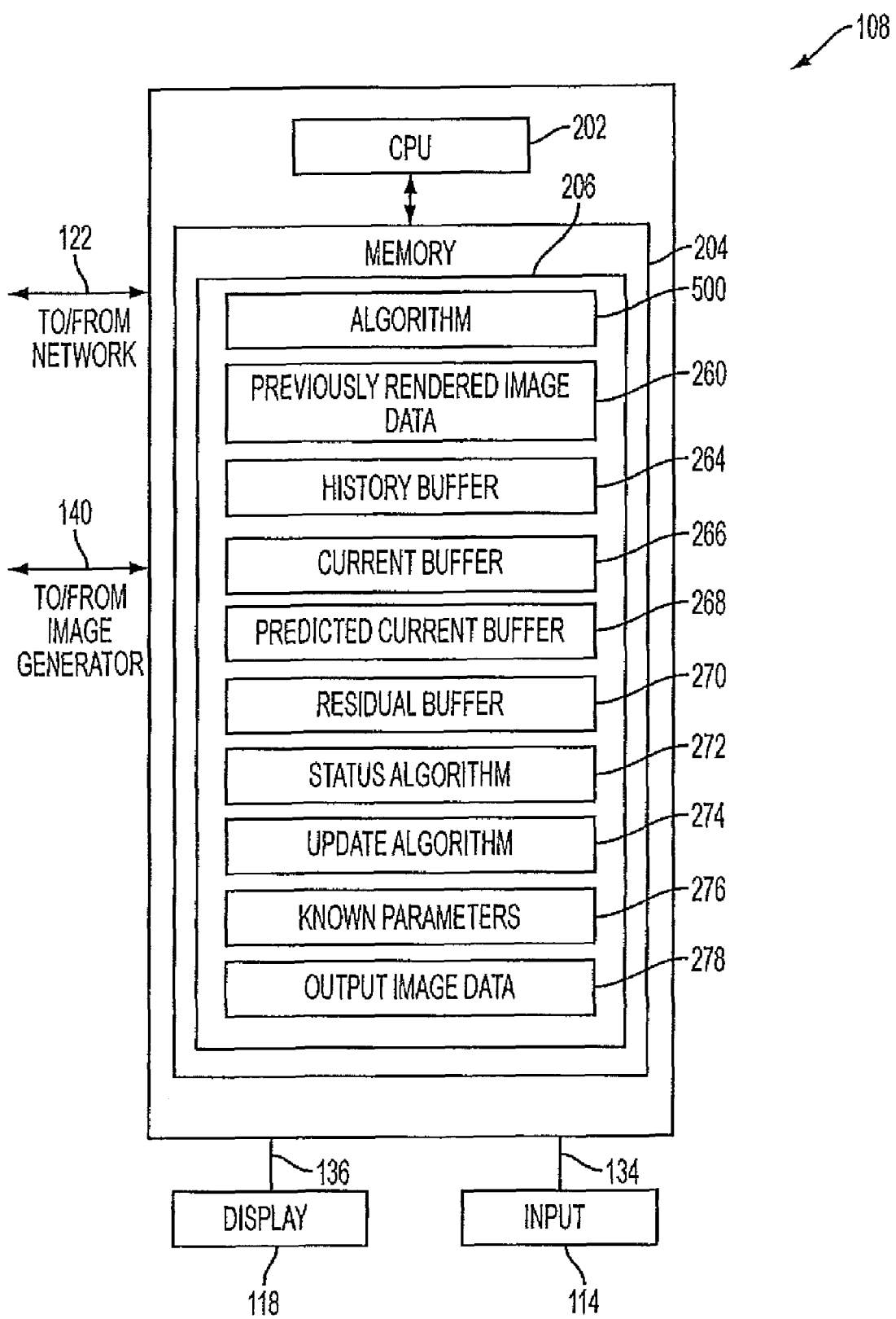
FIGS. 2A and 2B show examples of a client terminal and a server apparatus, respectively, of an embodiment of the present invention.

FIG. 2A illustrates an example of a client appliance 108 that may be used with the present invention. The client appliance may be a fat terminal or a thin terminal (a thin client, sometimes also called a lean client, is a computer (client) in client-server architecture networks which depends primarily on the central server appliance for processing activities.

Client appliance 108 includes a CPU 202 and memory 204. Also shown in FIG. 2A are the bi-directional communication media 122 (to/from network 124) and 140 (to/from image producing apparatus 150). Display module 118 and input module 114 and associated communication media 136 and 134, respectively, are also shown.

The CPU 202 is typically a processor that includes an arithmetic logic unit (ALU), which performs arithmetic and logical operations, and a control unit (CU), which extracts instructions from memory and decodes and executes them, utilizing the ALU when necessary.

Memory module 204 is typically an electronic storage medium such as RAM, ROM, EEPROM or other memory device, such as an optical disk, optical tape, CD, or a floppy disk, a hard disk, or a removable cartridge, on which digital information is stored in the form of bits. It may also include recorders to record to and read from mass storage devices such as, for example, optical disks, magnetic disks, flash semiconductor disks, and other types of storage which may be temporary or permanent.

The memory module 204 stores programs 206, which include, for example, a web browser (not shown), algorithm storage module 500, previously rendered image data storage module 260, history buffer storage module 264, current buffer storage module 266, predicted current buffer storage module 268, residual buffer data storage module 270, status algorithm storage module 272, update algorithm storage module 274, known parameter storage module 276 and output image module 278, as well as typical operating system programs (not shown), input/output programs (not shown), and other programs that facilitate operation of client appliance 108. While FIG. 2A shows a plurality of memory storage locations, not all need to be used with the various embodiments of the present invention. For example, when the parameters of the image data are not known, the known parameter data will not be present. Thus, FIG. 2A is merely an example of one possible configuration to provide the requisite storage capacity for data of the present invention.

Memory module, or facility, 204 is used to store image data either received from the server appliance (shown as element 116 in FIG. 1) or generated by the CPU 202, based on data received from a source, such as a remote memory, or image data produced by an image producing apparatus (element 150 in FIG. 1) or network (element 124 in FIG. 1). The memory 204 may be accessed in such a way that the contents of the memory are provided to the CPU 202. Once the data has been accessed, typically by program code to fetch, or retrieve, the desired data stored in memory, it may be processed according to one or more algorithms described here.

The web browser (not shown) is, for example, an algorithm that provides World Wide Web (www) browsing functionality, for example, any ISP (Internet Service Provider) compatible program. Image data storage module 260 stores image data, such as medical image data obtained from an imaging technique, such as CT, PET, ultrasound, or other image data having a pixel representation. This data may be a volumetric representation formed by a configuration of voxels. Output image module 216 is used to store an output image generated by the algorithms. The output image may be stored, transmitted, printed, displayed or otherwise utilized.

Figure 2B:
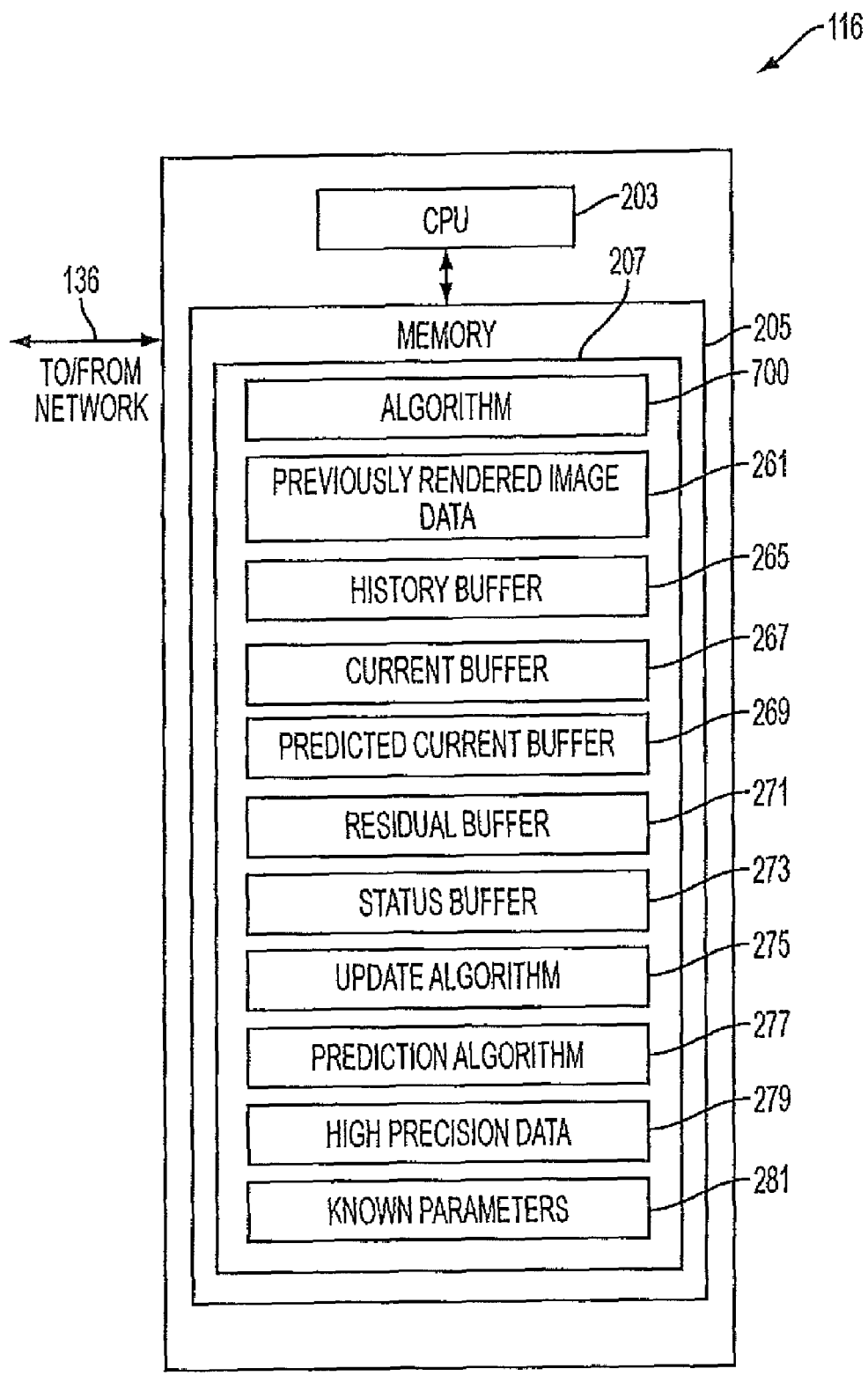

FIG. 2B shows an example of a server apparatus 116 that may be used in the present invention. The server 116 includes a CPU 203 and memory 205. Also shown in FIG. 2B is the bi-directional communication media 136 (to/from network 124)

The CPU 203 is typically a processor that includes an arithmetic logic unit (ALU), which performs arithmetic and logical operations, and a control unit (CU), which extracts instructions from memory and decodes and executes them, utilizing the ALU when necessary.

Memory module 205 is typically an electronic storage medium such as RAM, ROM, EEPROM or other memory device, such as an optical disk, optical tape, CD, or a floppy disk, a hard disk, or a removable cartridge, on which digital information is stored in the form of bits. It may also include recorders to record to and read from mass storage devices such as, for example, optical disks, magnetic disks, flash semiconductor disks, and other types of storage which may be temporary or permanent.

The memory module 205 stores programs 207, which include, for example, a web browser (not shown), algorithm storage module 700, previously rendered image data storage module 261, history buffer storage module 265, current buffer storage module 267, predicted current buffer storage module 269, residual buffer data storage module 271, status algorithm storage module 273, update algorithm storage module 275, prediction algorithm 277, high precision data storage module 279, known parameter storage module 281, as well as typical operating system programs (not shown), input/output programs (not shown), and other programs that facilitate operation of server appliance 116. While FIG. 2B shows a plurality of memory storage locations, not all need to be used with the various embodiments of the present invention. For example, when the parameters of the image data are not known, the known parameter data will not be present. Thus, FIG. 2B is merely an example of one possible configuration to provide the requisite storage capacity for data of the present invention.

Memory module, or facility, 205 is used to store image data either received from the network, and/or client appliance (shown as elements 124 and 108, respectively, in FIG. 1) or generated by the CPU 203, based on data received from a source, such as a remote memory, or image data produced by an image producing apparatus (element 150 in FIG. 1) or network (element 124 in FIG. 1). The memory 205 may be accessed in such a way that the contents of the memory are provided to the CPU 203. Once the data has been accessed, typically by program code to fetch, or retrieve, the desired data stored in memory, it may be processed according to one or more algorithms described here.

The web browser (not shown) is, for example, an algorithm that provides World Wide Web (www) browsing functionality, for example, any ISP (Internet Service Provider) compatible program. Image data storage module 261 stores image data, such as medical image data obtained from an imaging technique, such as CT, PET, ultrasound, or other image data having a pixel representation. This data may be a volumetric representation formed by a configuration of voxels.

Embodiments of the present invention are directed to rendering images, and performing operations such as windowing and leveling, when the parameters of a client appliance are known and rendering images when the parameters of a client appliance are unknown. The invention also considers the rendering from the client appliance perspective and the server appliance perspective.

Figure 3:
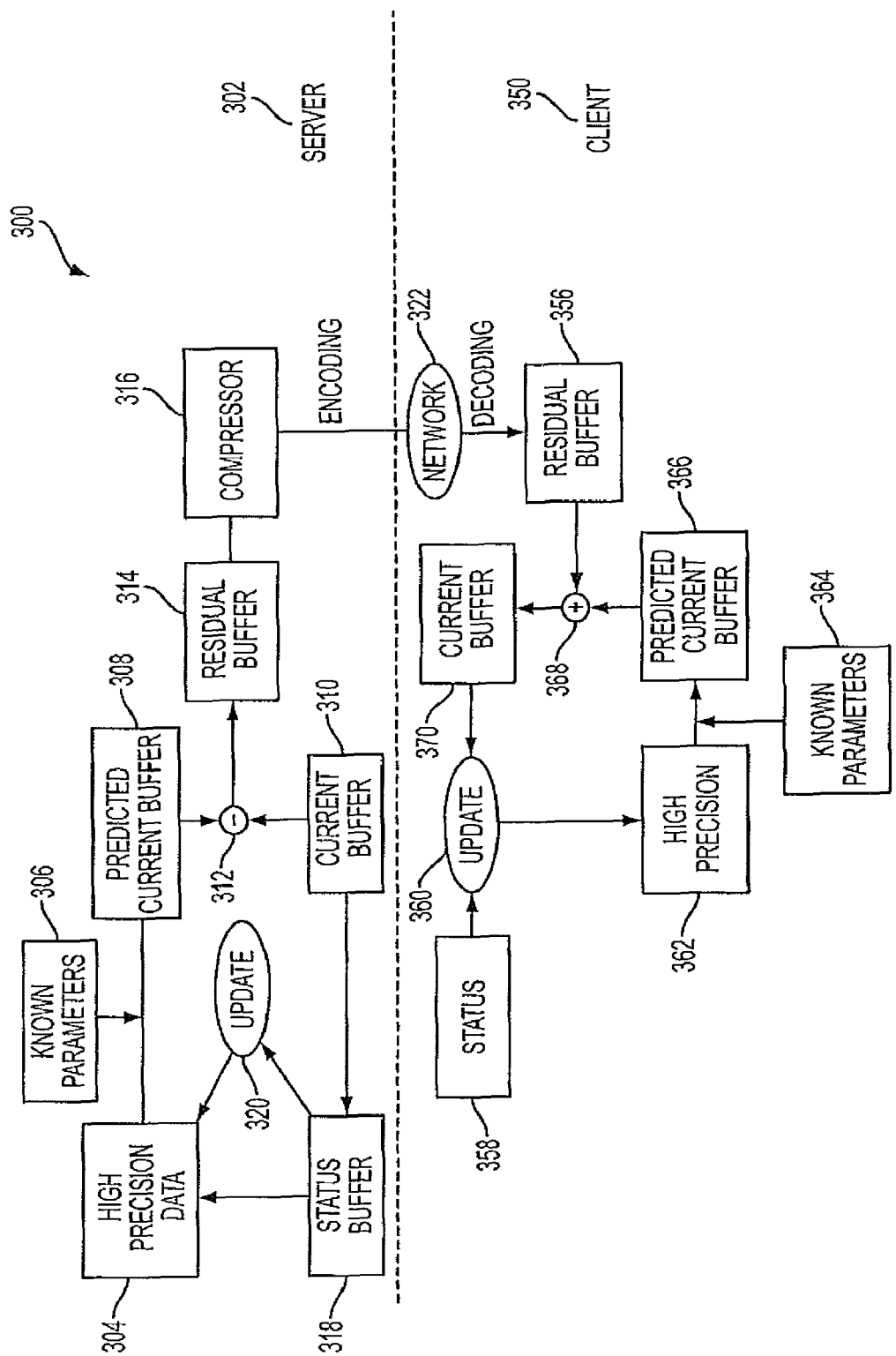
FIG. 3 shows a schematic diagram of a system for performing operations with known parameters.

FIG. 3 shows a schematic diagram of a system 300 for performing operations when the parameters of a client appliance are known. These operations may be, for example, panning, zooming, windowing and leveling and other data manipulations. A server side 302 and a client side 352 are provided. High precision image data, which is stored in storage module, or facility 304 is accessed. Storage module or facility 304 is, for example, an electronic medium such as EEPROM, PROM, RAM, ROM, CD or other electronic storage facility. Known parameters for a client appliance to perform an operation, such as panning, zooming, windowing and leveling and other operations are stored in storage module 306 and are then accessed. The known parameters are then applied to the high precision image data stored in storage facility 304 to generate a predicted current buffer.

The predicted current buffer is an estimation or approximation of the current buffer data. The prediction method can be any suitable method. For example, a less square method, as described previously, could be used. The predicted current buffer data is then stored in storage 308. Actual current buffer data, stored in storage module 310 is then accessed. The actual current buffer data may be for example, low precision data, such as 8 bits per pixel (bpp), which corresponds to a 12 bpp image. The predicted current buffer data is then subtracted from the current buffer data, as shown by subtraction operator 312. The subtraction step generates the residual buffer data, which is stored in storage module 314. The residual buffer represents a difference between the predicted current buffer and the actual current buffer. Thus, the residual buffer may be thought of as an error component. The residual buffer data is then accessed and compressed, as shown by compressor module 316, which may also encode the residual buffer data. The residual buffer data is then provided to a transmission medium, such as a bus, LAN, WAN Internet or other network, cable wireline or wireless transmission medium and transmitted across network 322.

The current buffer data stored in storage 310 is then stored in a status buffer at status buffer storage facility, or module 318. An update algorithm 320 then updates the high precision image data as a function of the status buffer data stored at storage 318.

The client side 350 then receives the residual buffer data, which is typically encoded and compressed. The residual buffer data is the decoded and/or expanded, depending on the form of the residual data. The received residual buffer data is then stored in facility or module 356. Status buffer data, stored in storage module 358, is then accessed. The status buffer data is then combined with previously determined current buffer image data (module 370) to update the high precision image data, as shown by module 360. The high precision image data, generated as a function of update procedure 360, is then stored in storage module 362.

Known parameters, for example, windowing and leveling parameters, stored in module 364 are then accessed. The known windowing and leveling parameters are then applied to the high precision image data to predict the current buffer. The predicted current buffer data is stored in module 366. The predicted current buffer data, stored in module 366, is then added to the residual buffer data stored at storage 356 by addition process 368. The result of addition process 368 is the actual current buffer. The actual current buffer data is then stored at storage 370. At a later time, different known windowing and leveling values may be applied. As such, the actual current buffer data stored at storage 370 will become previous current buffer data. This previous current buffer data will then be combined with the status buffer data to give the new high precision image data through update process 360.

Figure 4:
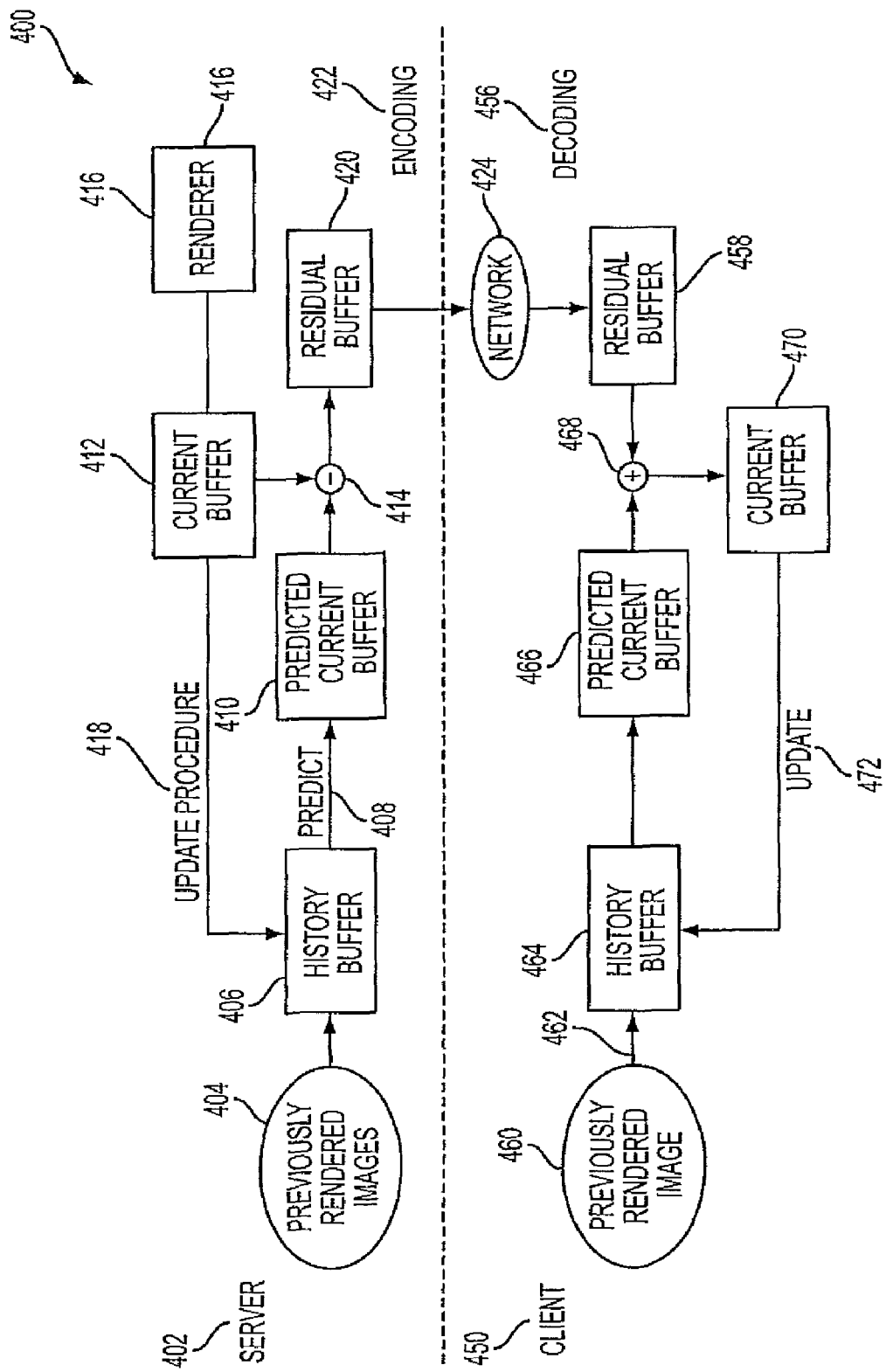
FIG. 4 shows a schematic diagram of a system for performing operations with unknown parameters.

FIG. 4 shows a schematic diagram of a system 400 for performing operations with unknown parameters. Server side 402 and a client side 450 are provided. Previous rendered image data are stored in storage module 404. The previously rendered image data are used to create a history buffer, which is stored in history buffer module 406. The stored history buffer data 406 is then accessed and used to generate a predicted current buffer. A prediction algorithm, as described herein, may be used to generate the predicted current buffer. The predicted current buffer is stored in module 410.

Actual current buffer data (module 412) is rendered from three-dimensional image data by renderer 416 and stored in module 412. The current buffer data is used to update the history buffer data stored in module 406 by update procedure 418. The predicted current buffer data 410 is then subtracted from the current buffer data 412 by subtraction procedure 414. The subtraction step, performed by subtraction procedure 414 generates the residual buffer data, which is stored in module 420. The residual buffer data is then encoded by compression algorithm that operates in a compression module 422 residing at the server appliance 402. The encoded residual buffer data is then provided to a transmission medium, such as a bus, LAN, WAN Internet or other network, cable wireline or wireless transmission medium and transmitted across network 424 and the residual buffer is received at client appliance 450.

At client appliance 450, the encoded residual buffer data is decoded at decoding module 456. The decoded residual buffer data is then stored in module 458. The client appliance 450 then accesses previously rendered image data 460. An appropriate previously rendered image is selected to become the history buffer by a selection procedure 462. Selection procedure 452 is described herein. More than one frame could be used for the history buffer. However, the current example uses only one frame for the history buffer because a single frame contains less data than multiple frames and will accommodate thin client devices. The history buffer data is then stored in module 464. The history buffer data 464 is then used to generate a predicted current buffer 466. The predicted current buffer data 466 is then added to the stored residual buffer data 458 by addition procedure 468. This addition step generates the current buffer data 470. Update procedure 472 then updates the history buffer data 464 using the current buffer data 470.

Figure 5:
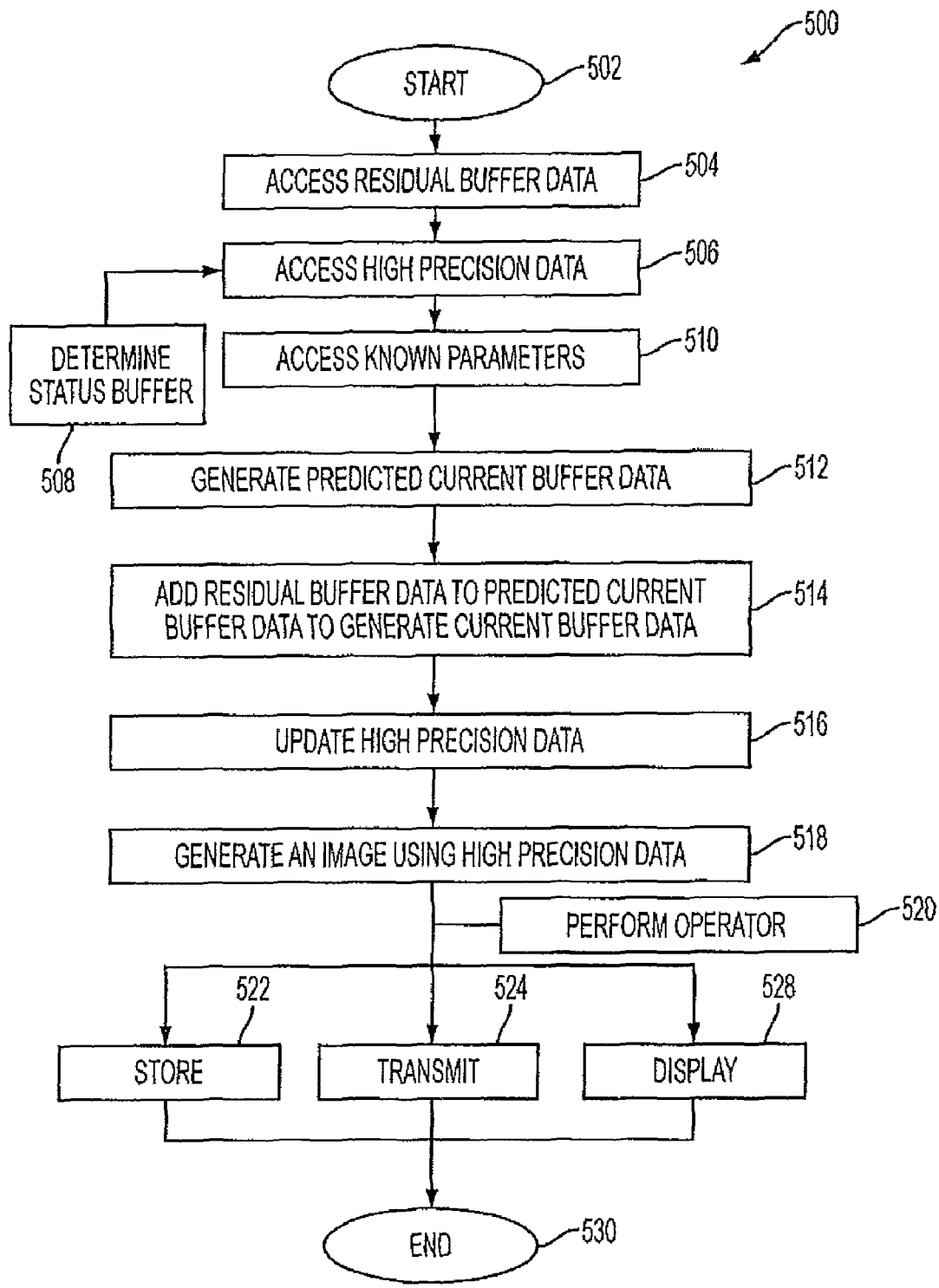
FIG. 5 shows a flowchart of steps to implement an embodiment of rending, from a client perspective, with known parameters, according to an embodiment of the present invention.

FIG. 5 shows a flowchart of steps 500 to implement an embodiment of rending, from a client perspective, with known parameters. The steps 500 may be executed by a processor, or otherwise executed to perform the identified functions and may also be stored in one or more memories. For example, the steps of FIG. 5 may be stored on a computer-readable medium, such as ROM, RAM, EEPROM, CD, DVD, or other non-volatile memory. The algorithm begins with start step 502. Residual buffer data is accessed, as shown in step 504. High precision data is accessed, as shown in step 506. A status buffer is determined, as shown in step 508. The status buffer is used to update the high precision data. Known parameters, such as parameters for windowing and leveling, are accessed, as shown in step 510.

A predicted current buffer is generated, as shown in step 512. The residual buffer data is added to the predicted current buffer to generate current buffer data, as shown in step 514. The high precision data is updated, as shown in step 516. An image is rendered using the high precision data, as shown in step 518. An operation, such as panning, zooming, windowing and leveling may be performed on the rendered image, as shown in step 520. The rendered image may be stored in a memory (522) and/or transmitted to another location (524) and/or displayed on an output terminal (528). The algorithm ends, as shown in step 530.

Figure 6:
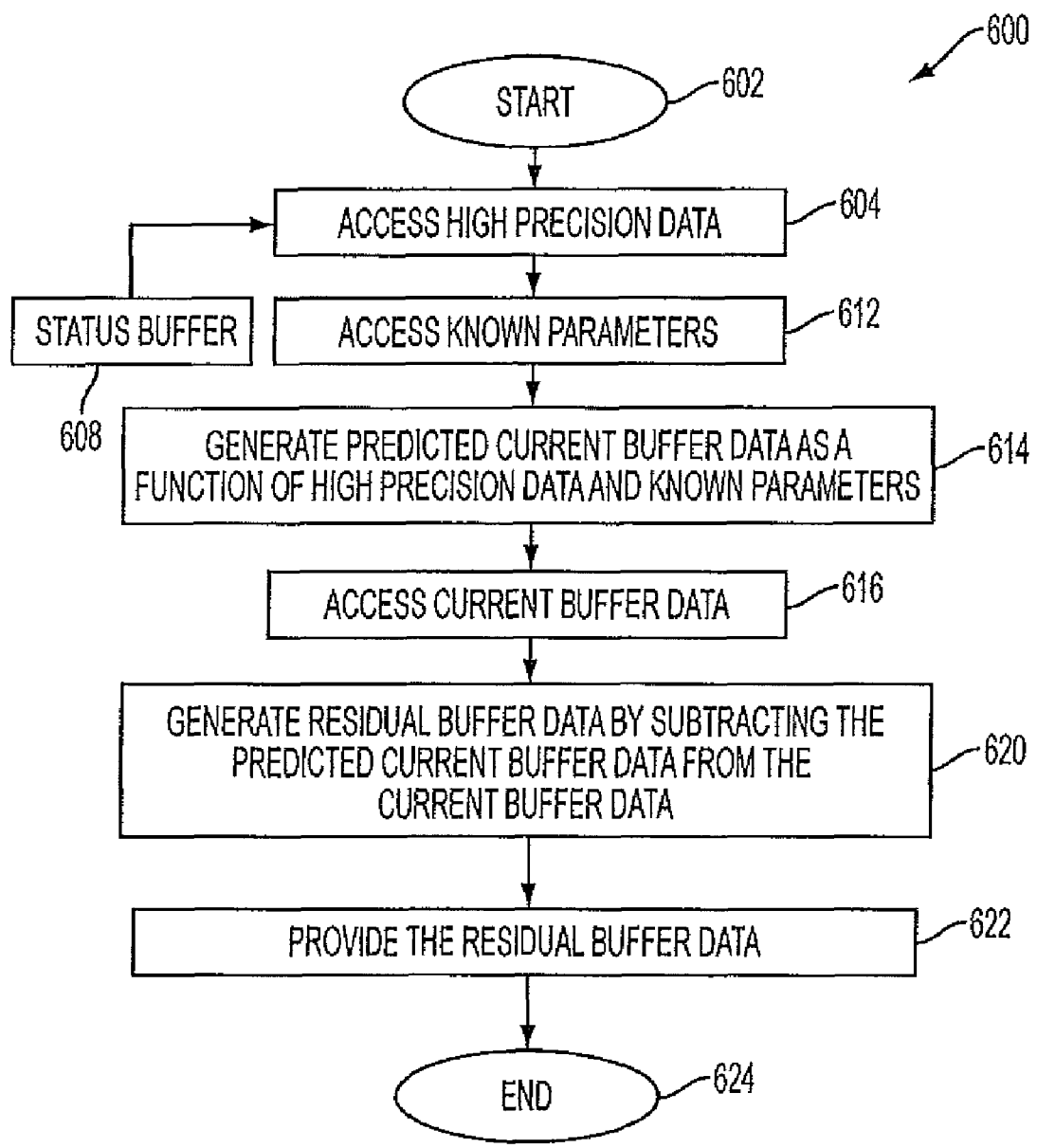
FIG. 6 shows a flowchart of steps to implement an embodiment of rending, from a server perspective, with known parameters, according to an embodiment of the present invention.

FIG. 6 shows a flowchart of steps 600 to implement an embodiment of rending, from a server perspective, with known parameters. The steps 600 may be executed by a processor, or otherwise executed to perform the identified functions and may also be stored in one or more memories. For example, the steps of FIG. 6 may be stored on a computer-readable medium, such as ROM, RAM, EEPROM, CD, DVD, or other non-volatile memory. The algorithm begins with start step 602. High precision data is accessed, as shown in step 604. A status buffer is determined, as shown in step 608. The status buffer is used to update the high precision data. Known parameters, such as parameters for windowing and leveling, are accessed, as shown in step 612.

A predicted current buffer is generated, as shown in step 614. The predicted current buffer data is generated as a function of the high precision data and the known parameters. Current buffer data is accessed, as shown in step 616. Residual buffer data is generated by subtracting the predicted current buffer data from the current buffer data, as shown in step 620. The residual buffer data is then provided to a transmission medium, such as a bus, LAN, WAN Internet or other network, cable wireline or wireless transmission medium and/or transmitted across a network, as shown in step 622. The algorithm ends, as shown in step 624.

Figure 7:
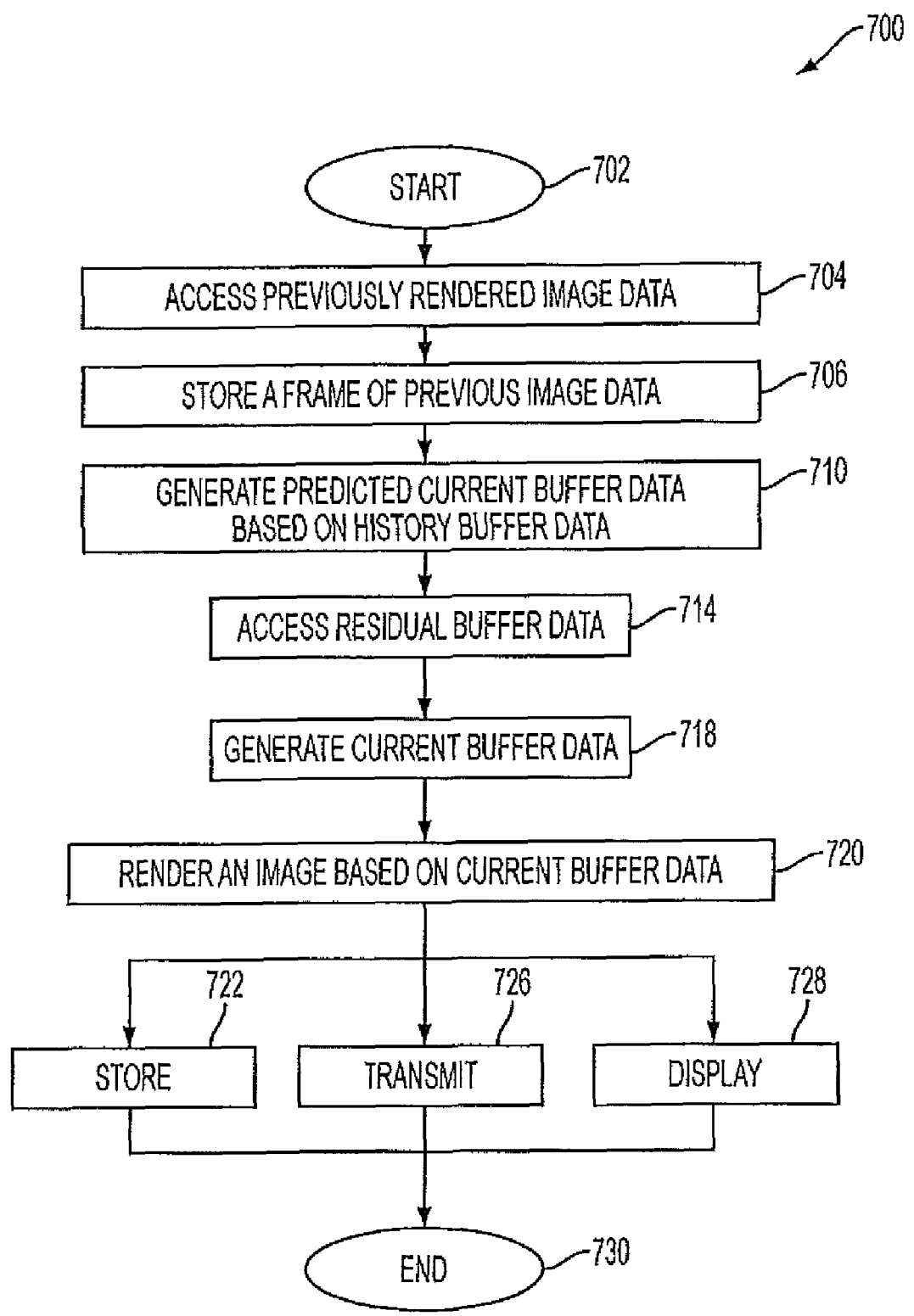
FIG. 7 shows a flowchart of steps to implement an embodiment of rending, from a client perspective, with unknown parameters, according to an embodiment of the present invention.

FIG. 7 shows a flowchart 700 of steps to implement an embodiment of rending, from a client perspective, with unknown parameters. The steps 700 may be executed by a processor, or otherwise executed to perform the identified functions and may also be stored in one or more memories. For example, the steps of FIG. 7 may be stored on a computer-readable medium, such as ROM, RAM, EEPROM, CD, DVD, or other non-volatile memory. The algorithm begins with start step 702. Previously rendered image data is accessed, as shown in step 704. One or more frames of the previously rendered image data is stored, as shown in step 706. Predicted current buffer data is generated based on history data, as shown in step 710. Residual data is accessed, as shown in step 714, and current buffer data is generated, as shown in step 718. The current buffer data is generated by adding the residual buffer data to the predicted current buffer data.

An image is rendered based on the current buffer data, as shown in step 720. The rendered image may be stored in a memory (722) and/or transmitted to another location (726) and/or displayed on an output terminal (728). The algorithm ends, as shown in step 730.

Figure 8:
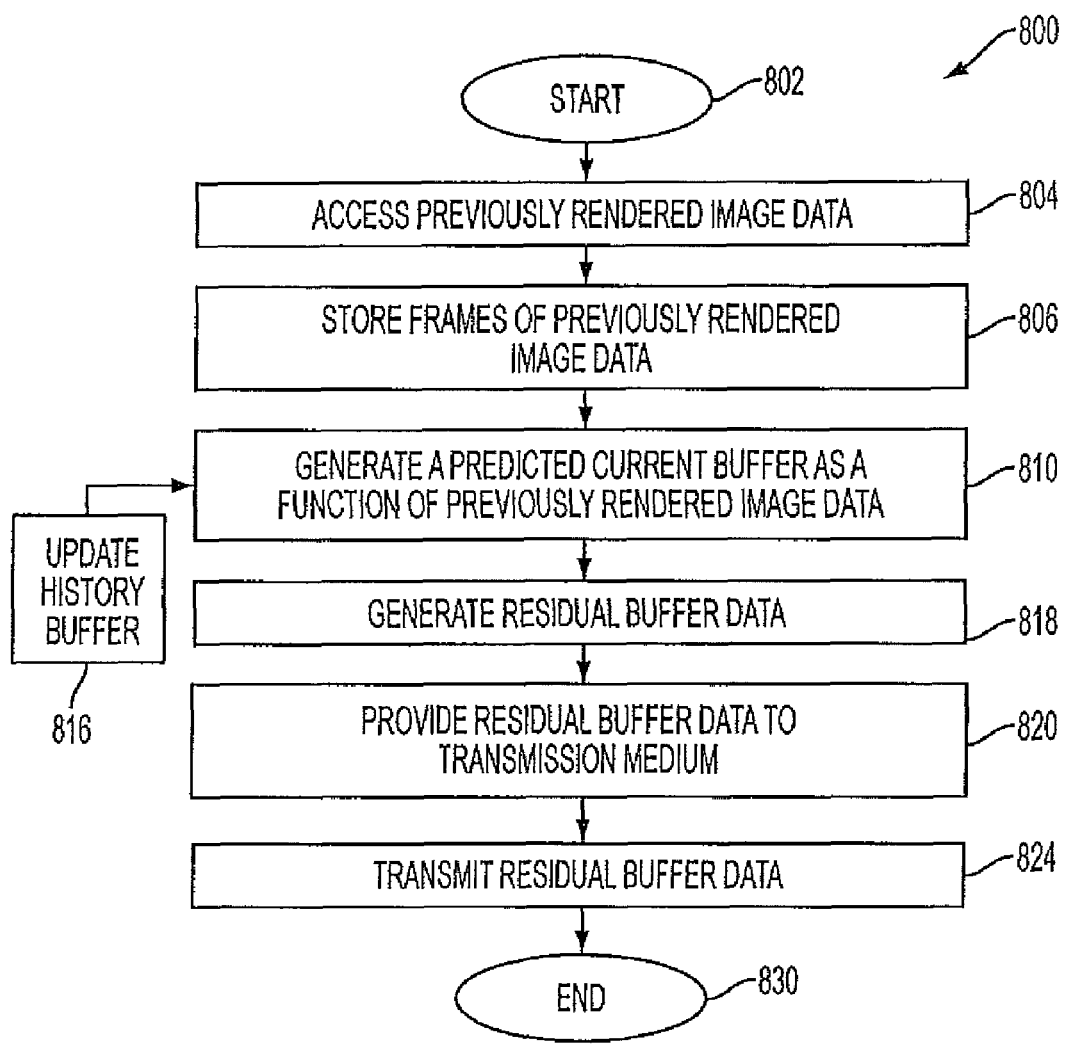
FIG. 8 shows a flowchart of steps to implement an embodiment of rending, from a server perspective, with unknown parameters, according to an embodiment of the present invention.

FIG. 8 shows a flowchart of steps 800 to implement an embodiment of rending, from a server perspective, with unknown parameters. The steps 800 may be executed by a processor, or otherwise executed to perform the identified functions and may also be stored in one or more memories. For example, the steps of FIG. 8 may be stored on a computer-readable medium, such as ROM, RAM, EEPROM, CD, DVD, or other non-volatile memory. The algorithm begins with start step 802. Previously rendered image data is accessed, as shown in step 804. One or more frames of the previously rendered image data is stored, as shown in step 806. Predicted current buffer data is generated based on previously rendered image data, as shown in step 810. The previously rendered image data, or history data, may be updated, as shown in step 816.

Residual data is generated as shown in step 818. The residual buffer data is produced by subtracting the predicted current buffer from the current buffer. The residual buffer is provided to a transmission medium (step 820), such as a bus, LAN, WAN Internet or other network, cable wireline or wireless transmission medium and/or transmitted across a network, as shown in step 824. The algorithm ends, as shown in step 830.

Panning with Known Parameters

When the operations are panning, that is, a shifting of the previous image in the spatial domain, the calculation of the predicted image is straightforward after knowing the panning parameters relative to the previous image. Indeed, the history image can be directly shifted to the new position with the out-of-range part clipped and the empty part filled with the background. The client appliance can even directly predict panning. If the server appliance needs to perform this operation, then the panned image can be predicted by the compressor using the above method. A residual component may be calculated by subtracting the predicted image and sent to the client appliance. When the panning factors, or parameters, are not known to the compressor module, the factors, or parameters, need be estimated.

Zooming with Known Parameters

When the operations are zooming, that is, to enlarge or shrink the size of the previous image in the spatial domain, the calculation of the zoomed image is straightforward after knowing the zooming parameters relative to the previous image. Indeed, the previous image is either enlarged or shrunken by the known factor. After enlargement, the out-of-range part is clipped; or after shrinking, the empty part is filled with background values. The prediction can be directly performed by the client appliance. If the server appliance needs to take part in this process for 3D zooming, then the zoomed image can be predicted by the compressor in the above way. The residual component, after subtracting the predicted image, is transmitted to the client appliance. When the zooming factors are not known to the compressor, the factors need be estimated.

Leveling and Windowing without Known Parameters

While panning and zooming operations are relatively straightforward, leveling and windowing operations need be considered with more detail. In examining medical images typically produced by the apparatus described above, a doctor or nurse may want to look at the image with different levels of detail. Images rendered at a server appliance are usually of high precision, for example, 12 bit per pixel (bpp); while the client machine usually displays images at lower precision, for example, 8 bits per pixel (bpp). The images to be displayed at the client side are typically 8 bpp; however, the methods and systems described herein can be extended to other precisions. The operations of windowing and leveling are to adjust the high-precision image to 8-bit ones. Since the resultant 8-bit images can demonstrate different levels of details, these two operations are commonly used in clinical practice.

Since windowing and leveling are frequently used, it is possible to design corresponding compression methods so that the methods can be applied efficiently for different use scenarios. These methods may be provided in a toolbox, or software development kit, and may be used either implicitly or explicitly. When used implicitly, the methods are incorporated into the system and work systematically. When used explicitly, the user has the freedom to choose one of these methods to use.

One method is to transmit the high-precision image data directly from the server appliance to the client appliance. After receiving this image data, the client appliance does windowing and leveling, according to the user's choices of the window and level values, to reproduce 8-bit images for display. This method involves transmitting the whole image only once. Afterwards, the windowing and leveling operations are performed locally at the client appliance. This method is simple and efficient when used. However, due to potential restrictions on the client appliance and server appliance, this method may not be readily used in every scenario. For example, the server appliance may not be adapted to transmit the high-precision image to the client appliance due to proprietary restrictions. When the user only does few windowing and leveling operations, this might not be an efficient method.

When the windowing and leveling operations are to be performed and the above method cannot be readily used, an embodiment of the present invention is alternative methods and systems. Generally speaking, these methods generate 8-bit images at the server appliance (server side) and transmit the resultant images to the client appliance (client side). In so doing, it is possible to minimize the redundancy between the transmitted images and thus to reduce the use of bandwidths. Since these images are generated from the same source, there is an efficiency in coding. Each 8-bit image that is derived from the high-precision image is a frame. Then it is possible to reduce the inter-frame redundancy and relaying only the necessary new information to the client appliance. After this inter-frame handling, either lossless or lossy compression can be applied to encode the new information. The adoption of lossless or lossy compression methods or codecs depends on the application scenarios. For example, when doing measurements for diagnosis, the images need be loss less, and the inter-frame residues need be encoded without losing even a single bit. For lossless compression, any of the existing codecs can be utilized, e.g., JPEG-LS (XS), JPEG2000 lossless mode (J2K), Windows Media Photo (WMP), etc. For browsing and searching for interesting objects, the images may lose quality to a certain extent for faster transmission. Any efficient lossy codecs may be employed to code the inter-frame residue.

For inter-frame operations, when the values of window and level are unknown to the compressor, it is possible to utilize the available information provided by the previous frames. For the current t-th frame, I(t), t=1, 2, . . . , it is possible to choose to use all the information up to time (t−1) to predict it so that only the residue need be coded. In principle, the more previous information used, the better the prediction results. The buffer size depends on the resource of the client machine, or appliance. For thin client appliances, there may be limited buffer or memory size. For wide applicability to a variety of clients, it is helpful to use only one frame buffer. The extension to multiple frame buffers is straightforward using similar methods to those described herein, whenever more buffer or memory sizes are available for use.

When the sampling frequency of the values of different window and level is high, a simple yet effective way to use the available information is to take the difference between the consecutive frames I(t) and I(t−1) as the residual buffer. Only the residual buffer is coded and transmitted from the server appliance to the client appliance. To alleviate from the error drifting problem, every T>0 frames, it is possible to reset the original frame to be the residual buffer. The value of T can be chosen by the user. Experiments show that feasible values of T can be set to integers around 10. The higher T is, the lower the quality. This difference method can be efficient in terms of speed and compression ratio, when the operations of leveling and windowing are done in a high-frequency manner. That is, when the values of levels and windows are very close between consecutive frames, despite any small randomness. However, when the sampling frequencies are small, or there are big jumps frequently, the difference method is not suitable. In this case, it is possible to use a linear prediction method.

One method to do windowing and leveling is to use linear mapping, and then truncate the mapped values into the range of (0, 255). Due to rounding and truncation errors, or due to any source of noise, the truncated pixel values are not exactly recovered. However, by using a linear prediction from the previous image, it is possible to recover most of the useful information. As previously mentioned, the more history information used, the more accurate the prediction. It is not necessary to use the most recent image I(t−1). Instead, it is possible to retain a history buffer to provide sufficient information, denoted by U(t−I). It is possible to use a least square linear prediction method.

As mentioned above, a model may be fit by using I(t)=a+b*U(t−1)+N(t), where N(t) is zero-mean noise vector, the coefficients a and b were originally determined by the windowing and leveling operation. By assuming N(t) is Gaussian, it is possible to fit the model by using a linear regression method. In so doing, it is possible to choose a subset of image pixels to be within a well-defined range for both the update and the current images. By arranging the image pixels into an array; and taking the pseudo-inverse, taking the least square enables prediction of the current image. After truncating the predicted image, the residual image is coded. Again, the codec may be either lossless or lossy, depending on the user's choice and applications. The choice of the range depends on the windowing and leveling method. If there is no noise and the original operation is exactly linear, it is possible to choose to use few points to do the prediction. When there are some unexpected effects, however, it is helpful to use much larger subsets so that the prediction is global and stable. In this case, since there are only two coefficients, the computation can be fast since the inversion of the matrix is of small size.

The update image needs to be chosen carefully from the previous images. Some of them contain more detailed information, while some contain less. This is because the update image incurs information loss during windowing and leveling operations.

The update image may be selected on the fly so that richer and richer information may be provided. Two strategies may be used for update image selection. The first is to utilize a feedback loop. If the update image can accurately predict the current image, the update image is retained; otherwise, the update image is replaced by the current one. There are different ways to measure how well to predict the current image. Since the residual buffer will be compressed, a direct merit of measure is to use the size of the (compressed) residual buffer. The residual buffer can be determined at time t by R(t).

In the above algorithm, different truncation functions can be used. For example, with lossles compression, truncation function Tr(•) may simply be an identical function or a shifting function. While with lossy compression, Tr(•) may directly clip the out of range values. Other reasonable truncation functions may as be used. The merit of prediction can be measured in several ways. For example, the size of the residual buffer can be used for this purpose. If the compressed size of the residual buffer is smaller than a predefined value, that the prediction is acceptable also if the compressed size of the residual buffer is larger than a predefined value, the prediction is acceptable. The R-square value may be calculated using F statistics and p-values to indicate how closely the linear prediction is. When the R-square value is small in linear regression, the prediction is good. Alternative methods may as well be used to this end.

At the client side, the above procedure needs to be reversed to recover the current image I(t). That is, the residual image is first decompressed. Then the current image is predicted using the history buffer, and the values of a and b. The predicted image is corrected with the residual image. The history image is either retained or updated according to an indicator bit. The same truncation function is used to reverse the values. And the number of frames T need to be the same.

Leveling and Windowing with Known Parameters

When the values of leveling and windowing are known to the compressor, it is possible to design an efficient method to reduce the inter-frame redundancy. The idea is to recover or reconstruct the high-precision original image from the low-precision images to be displayed. This is done under conditions that there are no further distortions after being windowed and leveled.

When a low precision image is available with the known windowing and leveling parameters, it is possible to reverse the windowing and leveling process to calculate the original high-precision image. The windowing and leveling are lossy in terms of information content, because assuming the window length is DELTA, with commonly used windowing and leveling operation, an image pixel value is truncated with a window centered at the given level. Any pixel value beyond the window is clipped to the largest value within the window; and any pixel value below the window is clipped to the smallest. Afterwards, the values are renormalized by a factor of (255/DELTA) and rounded to the nearby integers. The truncation and rounding operations lead to the loss of information. Therefore, the reversion of the windowing and leveling process can only reconstruct the image to a certain precision. And this precision is determined by the factor of (DELTA/255). For different frames, different window and level lead to different precision. Within the same frame, those pixels within the window and those out of the window also have different precision.

To recover the original high-precision image, —it is possible to set a recovered buffer to contain the high-precision reconstructed image from low-precision ones. It is also possible to make use of a status buffer to indicate the precision of each pixel of the reconstructed image. The reconstructed high-precision image is denoted by R(t) and the status image is denoted by S(t). The (i, j)th pixel of R(t) is denoted by R(t; j). And similarly for S(t; j).

Algorithms for Implementation and Example Results

The following presents the algorithms and experimental results of the present invention.

Algorithms for Panning with Known Values

Assuming the previous image I(t−1; x, y) at time t>0, and the panning parameter (x0, y0). The predicted new image would be PI(t; x−x0, y−y0). For out of range values, it is helpful to perform clipping and for empty space without previous values, it is helpful to pad background pixel values. The residual values are sent using still image codecs chosen by the user. The interframe structure is similar to that for windowing and leveling with unknown values.

Algorithms for Zooming with Known Values

Assuming the previous image I(t−I; x, y) at time t>0, and the zooming parameter (a0, b0). That is, the x-axis and y-axis are to be scaled by a0 and b0, respectively. The predicted new image would be PI(t; a0*x, b0*y) followed by resampling into the existing grid. For out of range values, it is helpful to perform clipping; and for empty space without previous values, it is helpful to pad background pixel values. The residual values are to be sent using still image codecs chosen by the user. The inter-frame structure is similar to that for windowing leveling with unknown values.

Algorithms for Windowing and Leveling without Knowing Values

In order to window and level without known values, it is useful to define I(t) to denote the rendered image at time t, U(t) history buffer, R(t) residual image. The algorithm at the server side for encoding is as follows:

1. Initialize: at time 0, let U(0)=I(0), and R(0)=I(0);
2. At time t, assume U(t−1) is available, t>0; now compute R(t) and 11(t):
    Fit a linear mode/of I(t) using U(t−1) for coefficients a and b. The prediction method can be least square regression or other direct calculation;
    Calculate the residual R(t) by using Tr(I(t)−(a+b*U(t−1))), where Tr(•) is a truncation function. For compression and transition, the values out of the allowable range need be truncated; while the values in the range are retained linearly.
    Measure the merit of predication from the residual buffer. If the indicator of the merit is above THRESH, which is a threshold, then let U(t) U(t−1); otherwise, let U(t)=I(t).
    Compress the residual buffer either losslessly or lossyly, and transmit the residual buffer together with the coefficients a and b. A binary indicator for updating the history buffer is also transmitted to the client.
3. When t reaches the predefined value T for updating, set t=0 and go back to step 1.

In the above algorithm, different truncation functions can be used. For example, with lossless compression, truncation function Tr(•) may simply be an identical function or a shifting function. While with lossy compression, Tr(•) may directly clip the out of range values. Other reasonable truncation functions may also be used. The merit of prediction can be measured in several ways. For example, the size of the residual buffer can be used for this purpose. If the compressed size of the residual buffer is smaller than a predefined value, the prediction is acceptable, and vice versa. Alternatively, the R-square value may be calculated using F statistics and p-values to indicate how closely the linear prediction is. When the R-square value is small in linear regression, the prediction is acceptable. Alternative methods may also be used.

At the client side, the above steps are reversed to recover the current image I(t). That is, the residual image is first decompressed. Then the current image is predicted using the history buffer, and the values of a and b. The predicted image is corrected with the residual image. The history image is either retained or updated according to the indicator bit. The same truncation function is used to reverse the values. And the number of frames T are also the same.

Algorithms for Windowing and Leveling with Known Values

The same notation as above may be used to describe windowing and leveling with known values. Denote the reconstructed high-precision image by R(t), the status image by S(t). The (i, j)th pixel of R(t) is denoted by R(t; i, j). And similarly for S(t: j). The following algorithm may be used to compress the image with the high-precision image reconstructed:

1. Initialize at time t=0 the reconstructed high precision image R(0) with a reasonable number within the range, and the status image by 255.
2. With rendered image I(t) at time t>0, using the windowing and leveling process to produce an image PI from R(t−I). Calculate the residual I(t)−PI(t). Then encode and transmit the residual image to the client together with the known windowing and leveling values.
3. With rendered image I(t) at time t>0, calculate the reconstructed value of R(t) at each pixel (x, y) by reversing the windowing and leveling process for generating I(t; x, y). Calculate the precision of the reconstruction for each pixel (x, y) of S(t), determined by the window value. If the precision is better than the existing value of S(t−1; x, y), then update S(t; x, y) by the new precision, and updating R(t; x, y) by the newly reconstructed value; otherwise, let S(t; x, y)=S(t−1; x, y), and let R(t; x, y)=R(t−1; x, y).
4. Unless terminated, go back to step 2 and repeat the process.

At the client side, with the known values of windowing and leveling, and the residual image (decoded), we reverse Step 2 to reproduce the rendered image I(t). And use similar procedure to Step 3 to update the status and recover images.

Figure 9:
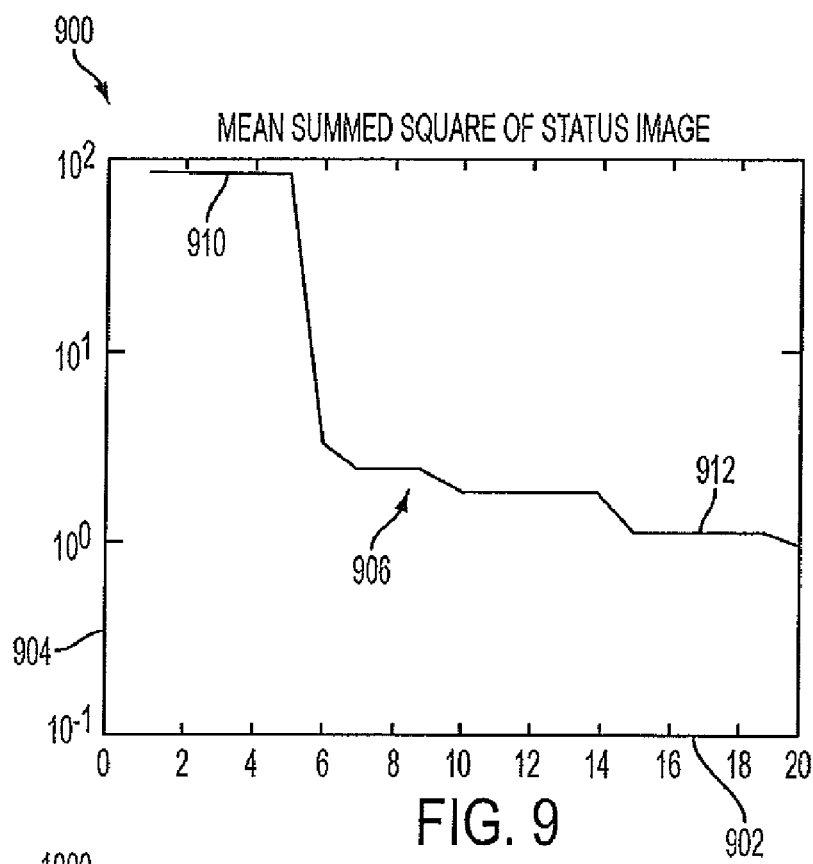
FIG. 9 shows a graph of an error factor quantity as a function of a number of frames.

FIG. 9 shows a graph 900 of an error factor quantity as a function of a number of frames. FIG. 9 shows horizontal axis 902 that plots a number of frames of and vertical axis 904 that plots a status of an image that is how close the re-constructed data matches the original data. As shown by portion 910 of line 906, when six or fewer frames have been used, the difference is very high. Portion 912 of line 906 shows that after 17 frames, the reconstructed data is substantially improved.

Figure 10:
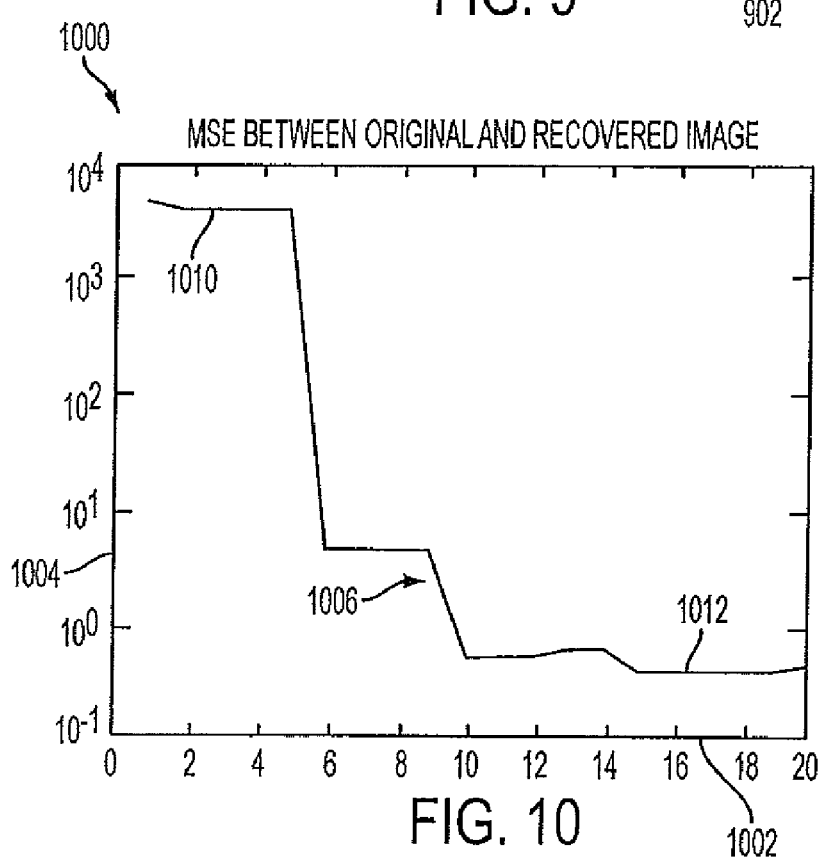
FIG. 10 shows a second graph of an error factor quantity as a function of a number of frames.

FIG. 10 shows a second graph 1000 of an error factor quantity as a function of a number of frames. FIG. 10 shows horizontal axis 1002 that plots a number of frames of and vertical axis 1004 that plots a how close the recovered image data matches the original data. As shown by portion 1010 of line 1006, when six or fewer frames have been used, the difference is very high. Portion 1012 of line 1006 shows that after 17 frames, the reconstructed data is substantially improved.

Figure 11:
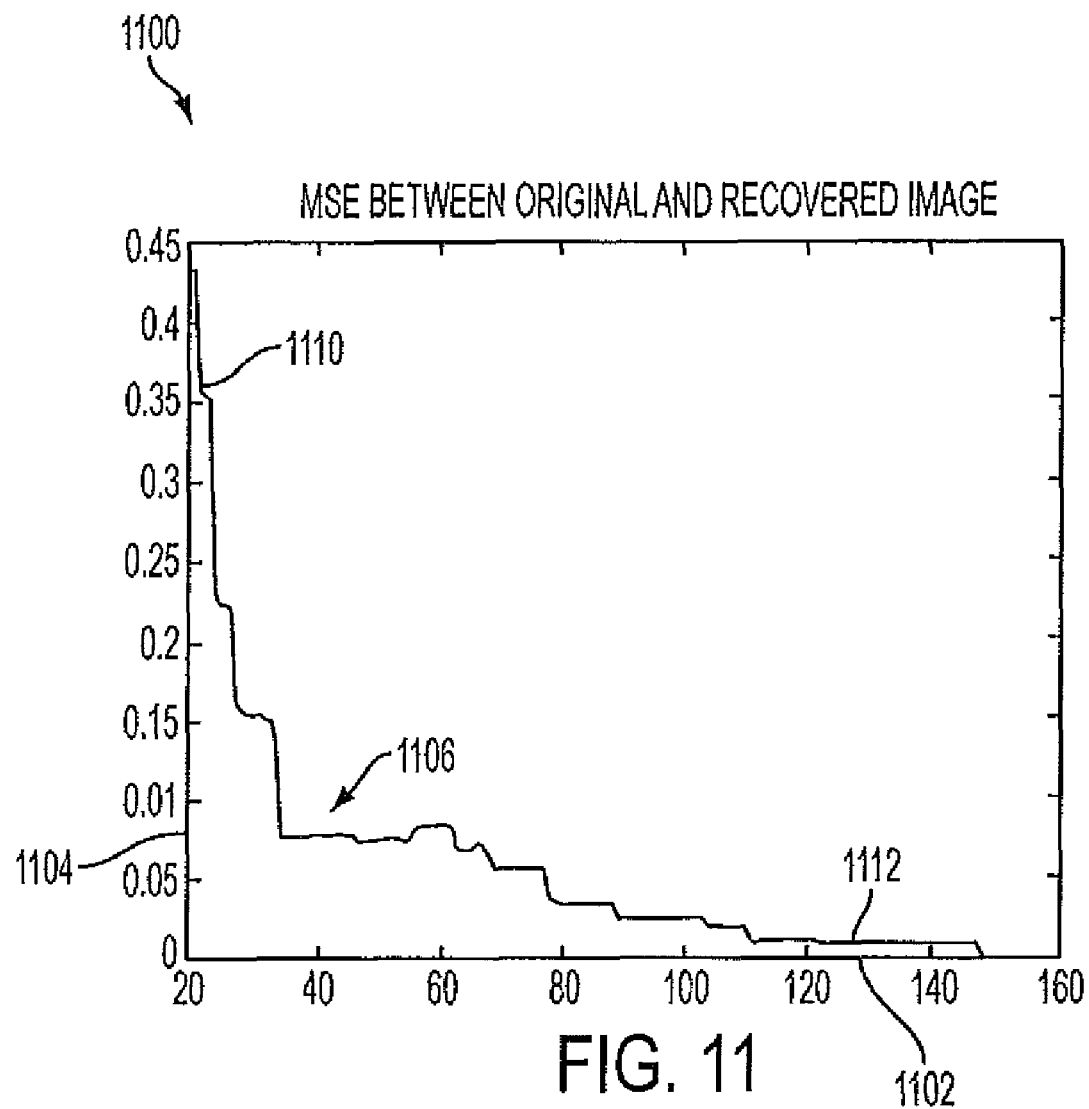
FIG. 11 shows a third graph of an error factor quantity as a function of a number of frames.

FIG. 11 shows a third graph 1100 of an error factor quantity as a function of a number of frames. FIG. 11 shows horizontal axis 1102 that plots a number of frames of and vertical axis 1104 that plots a how close the recovered image data matches the original data. As shown by portion 1110 of line 1106, when 20 or fewer frames have been used, the difference is very high. Portion 1112 of line 1106 shows that after 140 frames, the reconstructed data is substantially improved.

It will be appreciated from the above that embodiments of the invention may be implemented as computer software, which may be supplied on a storage medium or via a transmission medium such as a local-area network or a wide-area network, such as the Internet.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method, comprising:
accessing previously rendered image data;
storing at least one frame of previously rendered image data as history buffer data;
generating predicted current buffer data as a function of the history huffer data, the history buffer data providing information of window and level parameters which have unknown values;
accessing current buffer data;
generating residual buffer data as a truncation function of a result obtained by subtracting the predicted current buffer data from the current buffer data; and
providing the residual buffer data to a transmission medium.

2. The method of claim 1, further comprising:
encoding the residual buffer data.

3. The method of claim 1, further comprising:
overwriting the history buffer data with the current buffer data periodically.

4. An apparatus, comprising:
means for accessing previously rendered image data;
means for storing at least one flame of previously rendered image data as history buffer data;
means for generating predicted current buffer data as a function of the history buffer data, the history buffer data providing information of window and level parameters which have unknown values;
means for accessing current buffer data;
means for generating residual buffer data as a truncation function of a result obtained by subtracting the predicted current buffer data from the current buffer data; and
means for providing the residual buffer data to a transmission medium.

5. The apparatus method of claim 4, further comprising:
means for encoding the residual buffer data.

6. The apparatus of claim 4, further comprising:
means for overwriting the history buffer data with the current buffer data periodically.

7. A system, comprising:
one or more processors;
one or more memories, operatively coupled to the one or more processors, storing program code that cause the one or more processors to execute program code, comprising:
accessing previously rendered image data;
storing at least one frame of previously rendered image data as history buffer data;
generating predicted current buffer data as a function of the history buffer data, the history buffer data providing information of window and level parameters which have unknown values;
accessing current buffer data;
generating residual buffer data as a truncation function of a result obtained by subtracting the predicted current buffer data from the current buffer data; and
providing the residual buffer data to a transmission medium.

8. The system as claimed in claim 7, further comprising program code for:
encoding the residual buffer data.

9. The system as claimed in claim 7, further comprising program code for:
overwriting the history buffer data with the current buffer data periodically.

* * * * *